(12) United States Patent
Rehmeier et al.

(10) Patent No.: US 12,437,272 B2
(45) Date of Patent: Oct. 7, 2025

(54) SYSTEM AND METHODS FOR USING MACHINE LEARNING TO MAKE INTELLIGENT RECYCLING DECISIONS

(71) Applicant: Vestas Wind Systems A/S, Aarhus N. (DK)

(72) Inventors: Mie Rehmeier, Sabro (DK); Torben Ladegaard Baun, Skødstrup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/425,000

(22) Filed: Jan. 29, 2024

(65) Prior Publication Data

US 2024/0257079 A1    Aug. 1, 2024

(30) Foreign Application Priority Data

Jan. 31, 2023   (DK) .......................... PA 2023 70059

(51) Int. Cl.
*G06Q 10/00*      (2023.01)
*B09B 3/35*       (2022.01)
(Continued)

(52) U.S. Cl.
CPC ............... *G06Q 10/30* (2013.01); *B09B 3/35* (2022.01); *F03D 17/011* (2023.08); *F03D 17/028* (2023.08)

(58) Field of Classification Search
CPC ......... G06Q 10/30; B09B 3/35; F03D 17/001; F03D 17/028
See application file for complete search history.

(56) References Cited

U.S. PATENT DOCUMENTS 4,957,627 A * 9/1990 Fortuin ...................... B01J 8/16
                                                     210/268
10,227,470 B2 * 3/2019 Li ........................... B29B 17/00
(Continued)

FOREIGN PATENT DOCUMENTS

CN         101694182 A  *  4/2010
CN         101990170 B  *  11/2013
(Continued)

OTHER PUBLICATIONS

Junlei Chen, "Recycling and reuse of composite materials for wind turbine blades: An Overview", 2019, Journal of Reinforced Plastics and Composites, vol. 38 (2), 567-577. (Year: 2019).*
(Continued)

*Primary Examiner* — Tan D Nguyen
(74) *Attorney, Agent, or Firm* — Wood Herron & Evans LLP

(57) ABSTRACT

A device may receive historical operational data for a mechanical system, such as a rotor blade of a wind turbine. The device may determine one or more quality grades for each of one or more materials of the system, e.g., the rotor blade. The one or more quality grades may be determined by using a data model to process the historical operational data. The data model may be trained using machine learning based on one or both of historical operational data for similar systems, e.g., other rotor blades, and end-of-life (EOL) testing data for the same. The device may determine a recycling recommendation based on the one or more quality grades. The recycling recommendation may include instructions relating to recycling the one or more materials. The device may deliver the recycling recommendation to another device or recipient.

13 Claims, 10 Drawing Sheets

(51) Int. Cl.
*F03D 17/00* (2016.01)
*G06Q 10/30* (2023.01)

(56) References Cited

U.S. PATENT DOCUMENTS

| | | | | |
|---|---|---|---|---|
| 2009/0195496 | A1* | 8/2009 | Koyama | G09G 5/006 |
| | | | | 345/107 |
| 2010/0070905 | A1* | 3/2010 | Mizumori | C04B 28/02 |
| | | | | 715/772 |
| 2010/0204377 | A1* | 8/2010 | Morikawa | C08K 5/053 |
| | | | | 524/416 |
| 2010/0263748 | A1* | 10/2010 | Young | B32B 3/06 |
| | | | | 156/60 |
| 2017/0114294 | A1* | 4/2017 | Florido | C10L 3/101 |
| 2019/0066062 | A1* | 2/2019 | Lilly | B29B 17/0412 |
| 2019/0244439 | A1* | 8/2019 | Bassett | G07C 3/00 |
| 2023/0028266 | A1 | 1/2023 | Mohanty et al. | |

FOREIGN PATENT DOCUMENTS

| | | | | |
|---|---|---|---|---|
| CN | 105678025 A | * | 6/2016 | |
| CN | 105808829 A | * | 7/2016 | |
| CN | 107781118 A | | 3/2018 | |
| CN | 108799078 A | * | 11/2018 | F04B 49/065 |
| CN | 109376872 A | | 2/2019 | |
| CN | 109492345 B | * | 11/2020 | G06F 30/17 |
| CN | 114218690 A | | 3/2022 | |
| CN | 114781091 A | * | 7/2022 | |
| EP | 3608538 A1 | | 2/2020 | |
| WO | WO-2021026817 A1 | * | 2/2021 | F26B 15/18 |
| WO | WO-2021046667 A1 | * | 3/2021 | |
| WO | 2021244718 A1 | | 12/2021 | |

OTHER PUBLICATIONS

Rosario Fonte, "Wind Turbine blade recycling: An evaluation of the European market potential for recycled composite materials" 2021, Journal of Environmental Management, 287, 112269, pp. 1-13. (Year: 2021).*

Pu Liu, "Wind Turbine blade end-of-life options: An eco-audit comparison", 2019, Journal of Cleaner Production 212, pp. 1268-1281. (Year: 2019).*

Hardik K. Jani, "A brief review on recycling and reuse of wind turbine blade materials," 2022, Materials Today: Proceedings 62 (2022), pp. 7124-7130. (Year: 2022).*

Jelle Joustra, "Structural reuse of high end composite products: A design case study on wind turbine blades" 2021, Resources, Conservation & Recycling 167, pp. 1-10 (Year: 2021).*

J.P. Jensen, "Wind turbine blade recycling: Experiences, challenges and possibilities in a circular economy," 2018, Renewable and Sustainable Energy Reviews 97, pp. 165-176. (Year: 2018).*

Danish Patent and Trademark Office, technical examination issued in DK Application No. PA 2023 70059, dated Aug. 30, 2023.

International Searching Authority, International Search Report and Written Opinion issued in corresponding PCT Application No. PCT/DK2024/050023, dated Apr. 15, 2024.

Beauson J et al., "The complex end-of-life of wind turbine blades: a review of the European context", Renewable and Sustainable Energy Reviews. Elseviers Science, New York, NY, US. Vol. 155, Nov. 26, 2021, XP086913738 [retrieved Nov. 26, 2021].

Yang Y et al., "Recycling of composite materials", Chemical Engineering and Processing: Process Intensification, Elsevier Sequoia, Lausanne, CH, vol. 51, Sep. 20, 2011, pp. 53-68, XP028439361 [retrieved Oct. 20, 2011].

* cited by examiner

SYSTEM AND METHODS FOR USING MACHINE LEARNING TO MAKE INTELLIGENT RECYCLING DECISIONS

TECHNICAL FIELD

The present invention relates generally to methods of using machine learning to make intelligent recycling decisions when recycling composite materials, and more particularly to using machine learning to make intelligent recycling decisions when recycling materials of a wind turbine, such as a wind turbine blade.

BACKGROUND

Recycling is the act or process of converting a recyclable material into a reusable material. Typically, a recycling process involves manipulating or destroying the recyclable material (e.g., through a melting process, etc.) such that a resulting material may be used to create new products.

A wind turbine is a device that converts kinetic energy of the wind into electrical energy. For example, a wind turbine may convert kinetic energy of the wind into electricity by using the aerodynamic force created by the wind interacting with the rotor blades to turn an electrical generator.

Efforts to recycle components or materials of a wind turbine have been largely absent or ineffective. One reason is that many wind turbine components are made using composite materials, where multiple materials are bound together using an epoxy resin. A large part of the value in recycling composite materials is the actual removal or disposal of "waste" material that would otherwise be put in a landfill or would need to be recycled in another (even more expensive) way (e.g., in situations where the landfill was not allowed). Without an efficient and/or effective way to separate these materials, many components and/or materials of the wind turbine have been placed or buried in landfills without being recycled. However, new methods of recycling components and/or materials of a wind turbine have been discovered that involve separating each material of a composite material by exposing the composite material to a swelling agent (e.g., formic acid, etc.) for a certain time period. This causes the epoxy resin to disintegrate, allowing each material that had been bound together using the epoxy resin to separate.

While this breakthrough provides an avenue to begin recycling materials of a wind turbine, there are currently no processes in place that provide an efficient and/or effective way to recycle these materials. For example, recyclable materials used in a rotor blade of a wind turbine may be used to create a multitude of different new products. However, new products may have materials specifications that require materials to be of a certain quality grade. For example, if a new product is in any way associated with a safety risk or hazard, and that safety risk or hazard is amplified when the materials of the new product are of a lower quality grade, then the materials specifications for that new product may require that the materials be of a higher quality grade.

The residual strength of a material may be measured. Residual strength is the load or force that an object or material can carry or support (e.g., before reaching a breaking point, a failure point, etc.). Factors contributing to the residual strength of a material include material toughness, the presence (or absence) of fractures, the size, shape, and/or orientation of the fractures, and/or the like.

The quality of a recyclable material can vary due to a number of different reasons. For example, throughout the lifespan of a product, different events may occur to reduce the residual strength of that product's materials. Specifically, the residual strength of a material may deteriorate naturally over time, and further deterioration may be caused by events, such as when that material is exposed to harsh weather conditions, subjected to blunt physical impact, and/or the like.

Furthermore, different portions of the same material may have different residual strengths. For example, assume a component of a product is made using a certain material, but that only a portion of that component is damaged. In this case, a first portion of the material corresponding to the damaged component may have a low residual strength, while other portions of the material may have higher residual strengths.

Due to the variance in the residual strengths of materials (and the variance in different portions of the same material), some recyclable materials may be restricted to new product uses that are ordinarily reserved for lower quality grades of recyclable materials. For example, without an efficient and/or effective way to prove that a recyclable material is of a certain quality (e.g., has a certain residual strength), that material, once recycled, may be limited to uses reserved for lower quality grade materials, even if that material, or a portion of that material, is of a higher quality grade.

It is an object of the invention to mitigate or overcome some or all of the problems described above.

SUMMARY

In an aspect of the invention, a method of making a recycling recommendation by classifying materials of a rotor blade of a wind turbine is disclosed. The method includes receiving, by a computing device, historical operational data for the rotor blade of the wind turbine. The method further includes determining, by the computing device, one or more quality grades for each of one or more materials of the rotor blade. The one or more quality grades are determined by using a data model to process the historical operational data. The data model is trained using machine learning based on one or both of historical operational data for other rotor blades and end-of-life (EOL) testing data for the other rotor blades. The method further includes determining, by the computing device, the recycling recommendation based on the one or more quality grades. The recycling recommendation includes instructions relating to recycling the one or more materials of the rotor blade. The method further includes delivering, by the device, the recycling recommendation to another device or recipient.

In an embodiment of the invention, determining the one or more quality grades may include determining a quality grade for a material based on an expected reusability score. For example, the historical operational data may be provided as input to the data model to cause the data model to output an expected reusability score for the material.

In another embodiment of the invention, the expected reusability score may be based on at least one of an expected residual strength of the material, an expected structural integrity of the material, or expected end-of-life (EOL) fiber lengths of fibers associated with the particular material.

In another embodiment of the invention, the EOL testing data may include reusability scores for materials of the other rotor blades. Respective reusability scores represent a degree to which a material or a portion of that material is reusable.

In another embodiment of the invention, the data model may be trained using historical parts data that includes data identifying boundaries of components of the other rotor blades and data identifying boundaries of materials of respective components. The data model may be trained to associate each respective boundary and/or subset of a boundary with a reusability score.

In another embodiment of the invention, the historical operational data for the rotor blade may include at least one of installation data, service data, or weather data. The historical operational data for the other rotor blades may include daily operations data and at least one of installation data, service data, or weather data. In this way, certain types of daily operations data, which may be used to train the data model, may not be needed to accurately determine quality grades for materials of the rotor blade.

In another embodiment of the invention, determining the one or more quality grades may include determining a first quality grade for a first material of a component of the rotor blade and determining a second quality grade for a second material of the component of the rotor blade, where the first quality grade is different than the second quality grade. In another embodiment of the invention, determining the one or more quality grades may include determining a first quality grade for a first portion of a material of the rotor blade and determining a second quality grade for a second portion of the same material of the rotor blade, where the first quality grade is different than the second quality grade.

In another embodiment of the invention, determining the recycling recommendation may include determining a set of cut instructions indicating to cut the rotor blade in a way that separates materials or subsets of respective materials that have different quality grades. In still another embodiment of the invention, determining the recycling recommendation may include determining a set of bin placement instructions indicating to sort materials or subsets of materials into different recycling containers such that each respective recycling container corresponds to a specific quality grade.

In another embodiment of the invention, determining the recycling recommendation may include determining a set of cut instructions indicating to cut the rotor blade such that the cut separates the first portion of the material and the second portion of the material. In another embodiment of the invention, determining the recycling recommendation may include determining a set of bin placement instructions indicating to place the first portion of the material and the second portion of the material into different recycling containers.

In another aspect of the invention, a device performing any of the above methods is disclosed. In another aspect of the invention, a computer-readable medium performing any of the above methods is disclosed.

The above summary presents a simplified overview of some embodiments of the invention to provide a basic understanding of certain aspects of the invention discussed herein. The summary is not intended to provide an extensive overview of the invention, nor is it intended to identify any key or critical elements or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

It should be understood that the appended drawings are not necessarily to scale and may present a somewhat simplified representation of various features illustrative of the basic principles of the invention. The specific design features of the sequence of operations as disclosed herein, including, for example, specific dimensions, orientations, locations, and shapes of various illustrated components, may be determined in part by the particular intended application and use environment. Certain features of the illustrated embodiments may have been enlarged or distorted relative to others to facilitate visualization and a clear understanding.

DETAILED DESCRIPTION

The following detailed description of example embodiments refers to the accompanying drawings that show, by way of illustration, specific details and embodiments in which the invention may be practiced. These embodiments are described in sufficient detail to enable those skilled in the art to practice the invention. Other embodiments may be implemented, and structural, logical, and electrical changes may be made without departing from the scope of the invention as defined in the appended claims.

Figure 1:
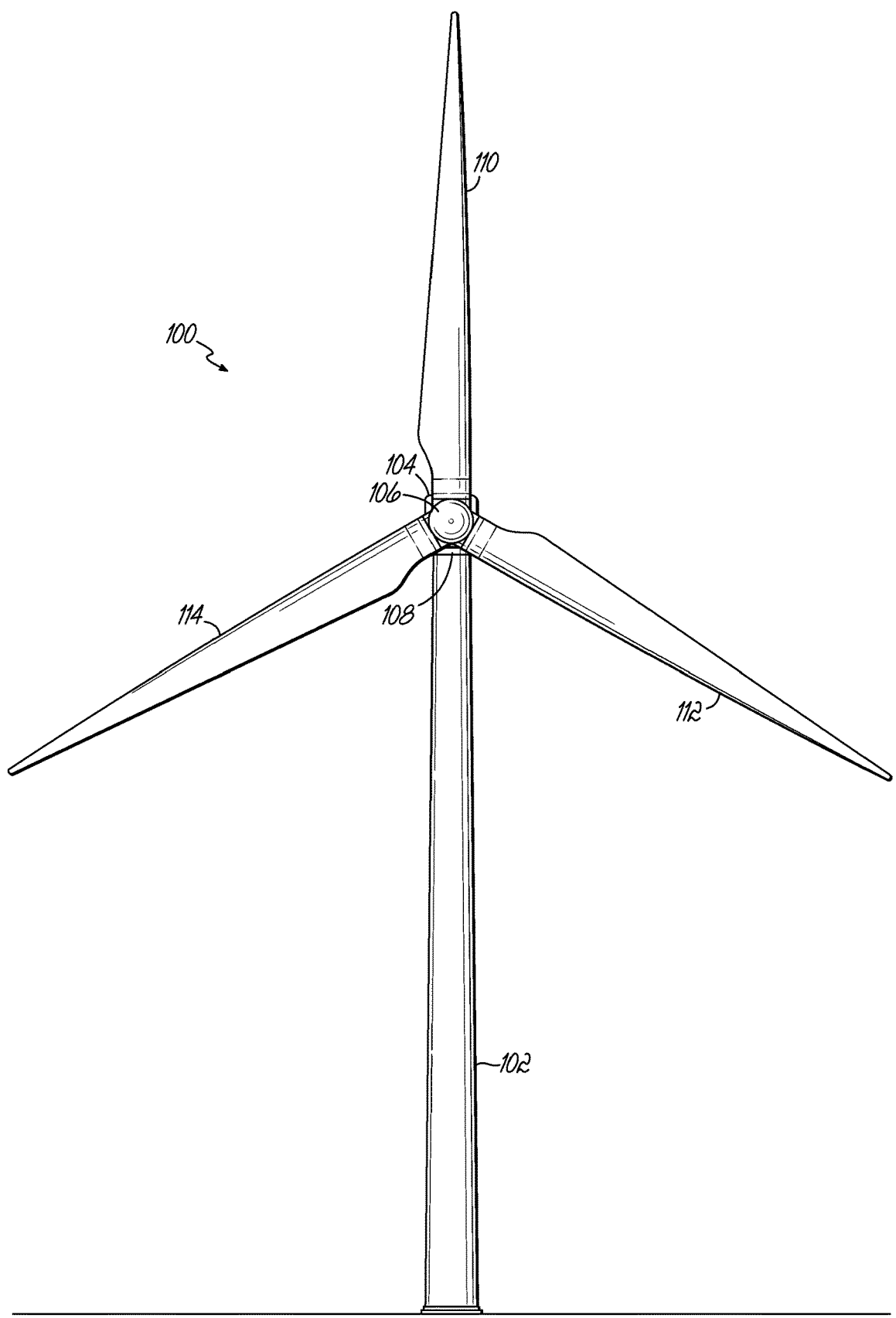
FIG. 1 shows a wind turbine in which the products of the invention could be advantageously used.

FIG. 1 shows a wind turbine 100 in which the products of the invention could be advantageously used. The wind turbine 100 includes a tower 102, a nacelle 104 on which a rotor 106 is mounted, and a yaw bearing 108. The yaw bearing 108 rotatably connects the tower 102 to the nacelle 104. The rotor 106 comprises a rotor hub to which, in this wind turbine 100, three rotor blades (shown as rotor blades 110, 112, and 114, respectively) are attached. The yaw bearing 108 is configured such that nacelle 104, together with the rotor 106 mounted thereon, is rotatable relative to the tower 102. As such, the nacelle 104 may be arranged such that the rotor 106 is oriented towards the wind. When oriented towards the wind, the wind turbine 100 is operable to generate more electricity.

Although one rotor 106 is illustrated in FIG. 1, it will be appreciated that multiple rotors may be carried by the tower 102. For example, a two-rotor configuration can be seen in US Pub. No. 2022/0025866 and a configuration with two pairs of rotors can be seen in WO-A1-2018/157897. Thus, aspects of the invention may apply to multi-rotor wind turbines or other types of wind turbines and should not be limited to that shown in FIG. 1.

Figure 2:
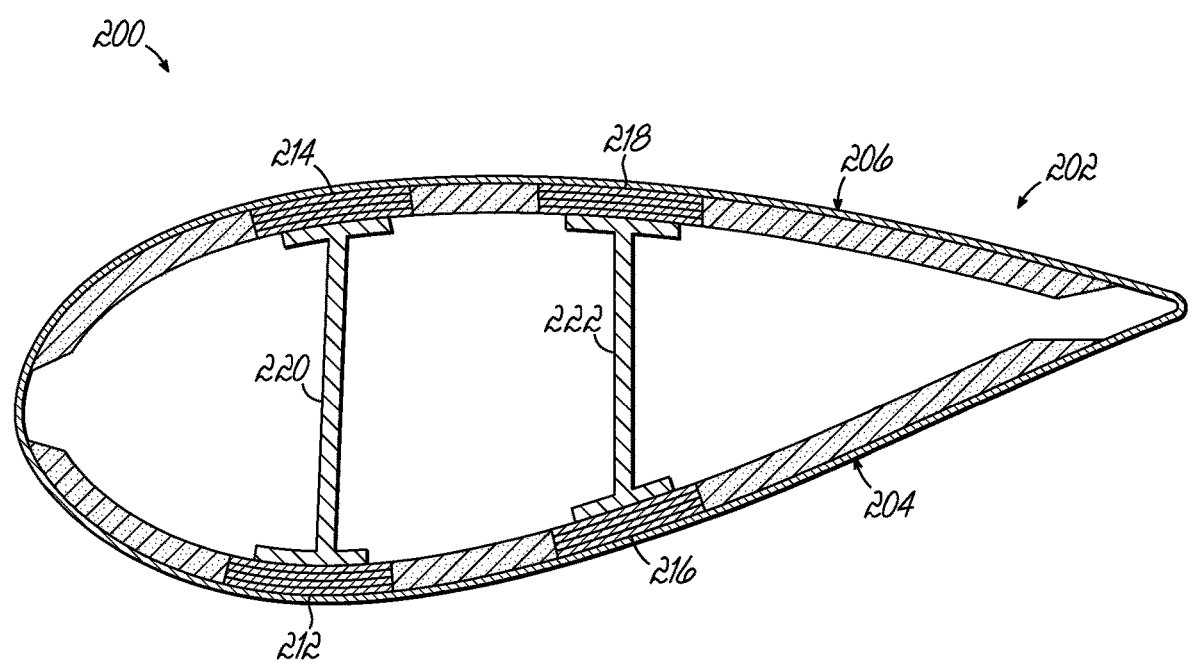
FIG. 2 shows a cross-sectional view of a rotor blade of a wind turbine.

FIG. 2 is a cross-sectional view of a rotor blade 200 of a wind turbine. In some embodiments, the rotor blade 200 may correspond to rotor blade 110, rotor blade 112, and/or rotor blade 114. The rotor blade 200 has a plurality of spar caps 212, 214, 216, and 218. The rotor blade 200 has an outer shell 202, which is fabricated from two half shells 204, 206. The shells 204, 206 are moulded from glass-fiber reinforced plastic (GRP). Parts of the outer shell 202 are of a sandwich panel construction and comprise a blade core of lightweight form (e.g., polyurethane), which is sandwiched between inner and outer GRP layers or 'skins.'

The rotor blade 200 comprises first and second pairs of spar caps 212, 214, 216, and 218, arranged between sandwich panel regions of the outer shell 208. One spar cap of each pair is integrated with the windward shell and the other spar cap of each pair is integrated with the leeward shell. The spar caps 212, 214, 216, and 218 of the respective pairs are mutually opposed and extend longitudinally along the length of the rotor blade 200. A first longitudinally extending shear web 220 bridges the first pair of spar caps 212, 214 and a second longitudinally extending shear web 222 bridges the second pair of spar caps 216, 218. The shear webs 220, 222 in combination with the spar caps 212, 214, 216, 218 form a pair of I-beam structures, which transfer loads effectively from the rotor blade 200 to the hub of the wind turbine (not shown). The spar caps 212, 214, 216, 218 in particular transfer tensile and compressive bending loads while the shear webs 220, 222 transfer shear stresses in the rotor blade 200.

In some embodiments, a spar cap (e.g., spar cap 212, 214, 216, 218) may be constructed using a stack of pultruded strips that are bonded together. The pultruded strips are bonded together by an adhesive, such as a resin (e.g., an epoxy resin). The pultruded strips are also arranged in the stack with its respective adherend surfaces in mutually opposed relation. The adhesive may be applied directly to the adherend surfaces of the pultruded strip or via another technique such as a resin infusion process. In an infusion process, liquid resin is supplied to the stack, and the resin infuses between the opposed adherend surfaces of the pultruded strips. The wind turbine blade 200 described above is exemplary, and wind turbine blades have a wide range of designs and constructions. Thus, it should be understood that aspects of the invention may apply to wind turbine arrangements other than that described above.

Figure 3A:
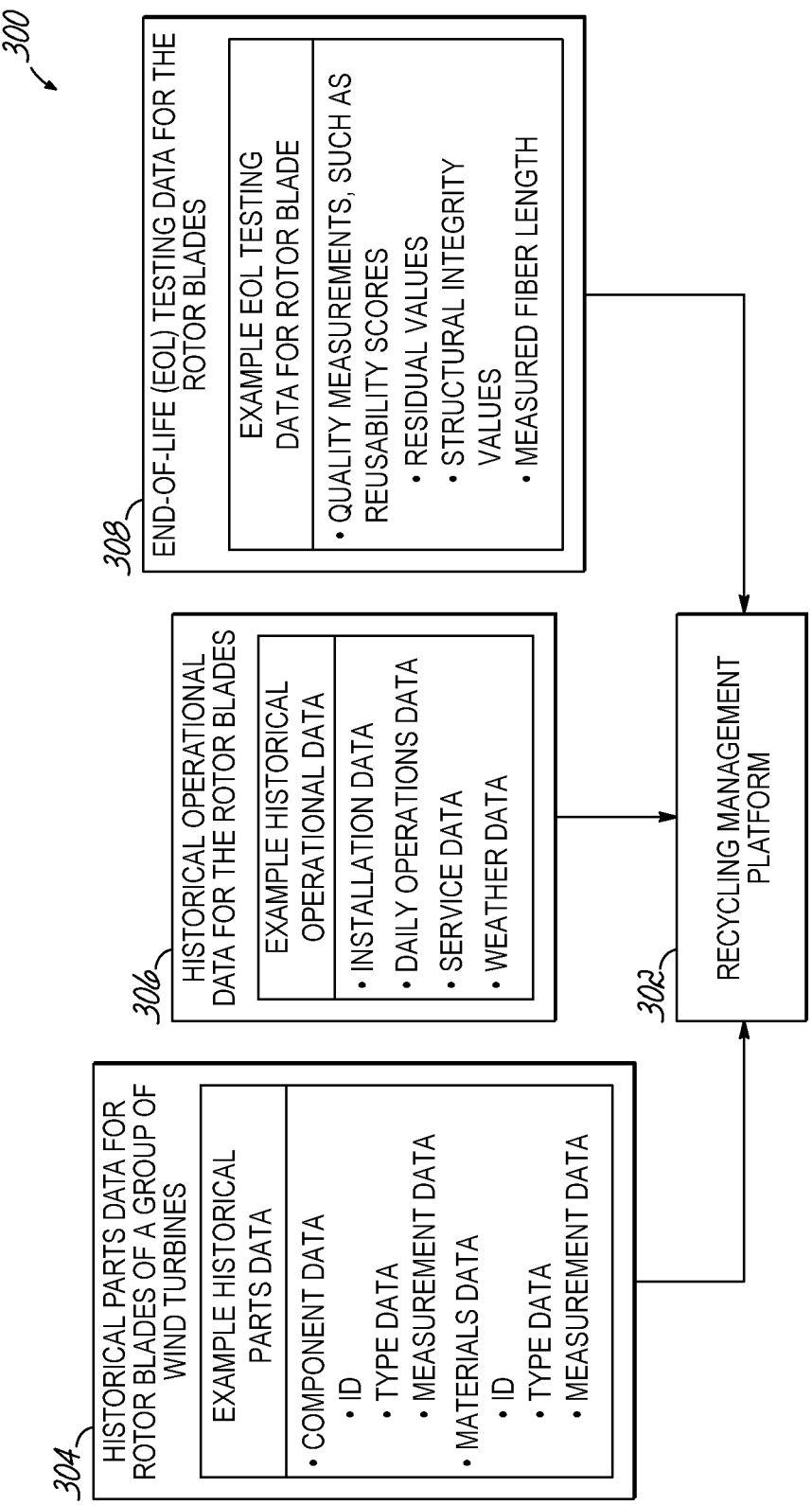
FIG. 3A is a diagram of a recycling management platform receiving historical data that is to be used to train a data model.
Figure 3B:
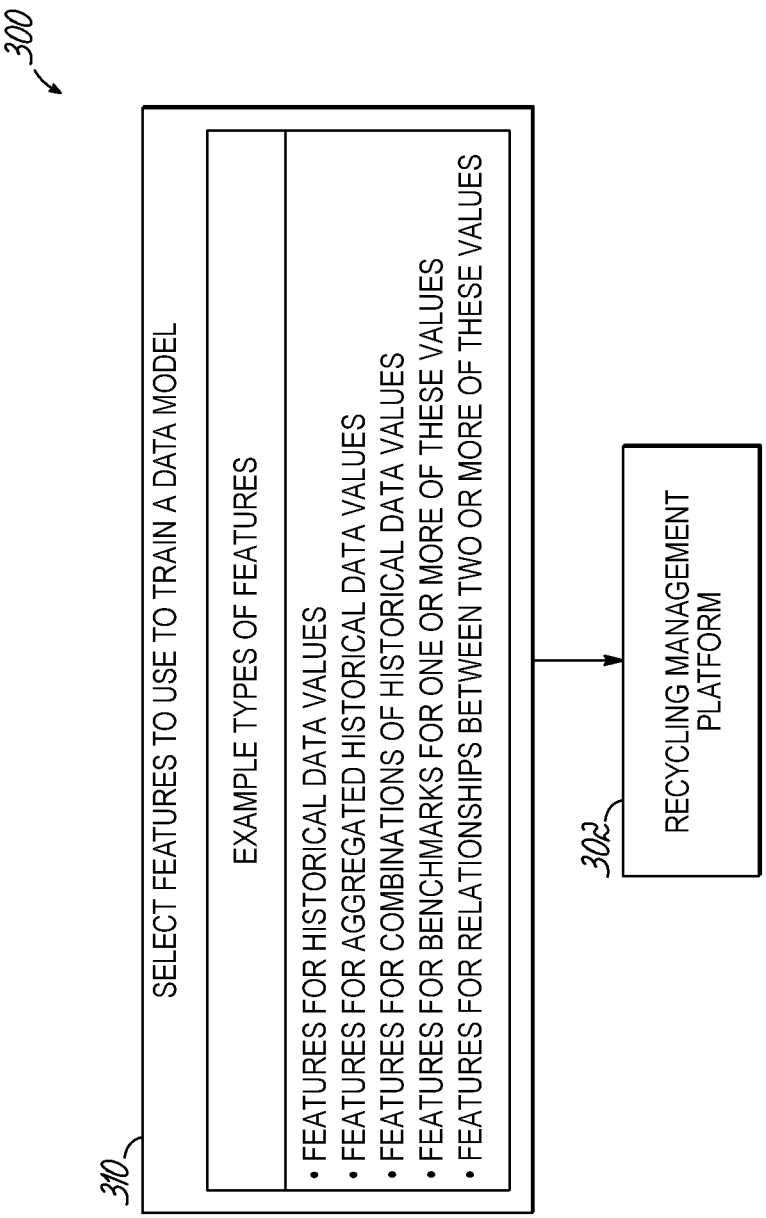
FIG. 3B is a diagram of the recycling management platform determining features to use to train the data model.
Figure 3C:
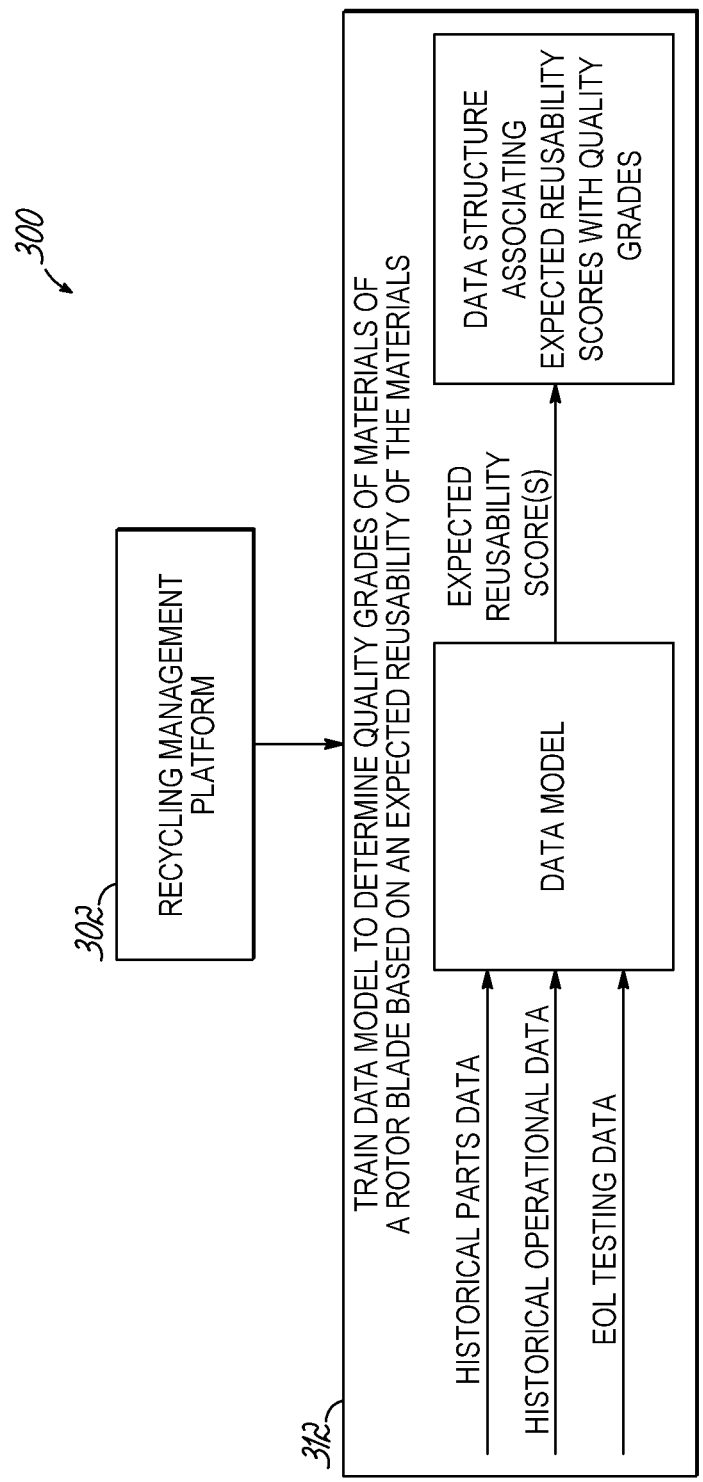
FIG. 3C is a diagram of the recycling management platform training the data model.

FIGS. 3A-3C are diagrams of an example method 300 for using machine learning to train a data model to determine quality grades for materials of a rotor blade of a wind turbine. The quality grades of the materials can then be used to make recycling commendations.

While one or more embodiments described herein refer to training a data model to determine quality grades for materials of a rotor blade, it is to be understood that this is provided by way of example. In practice, example method 300 may be used to train a data model to determine quality grades for materials used within other components of a wind turbine. Additionally, or alternatively, example method 300 may be used to train a data model to determine quality grades for materials of other devices/machines, such as materials of a printed circuit board (PCB), materials of a vehicle (e.g., a boat, a train, a car, etc.), composite materials, and/or the like.

As shown in FIG. 3A, the recycling management platform 302 may receive historical data that is to be used to train the data model. For example, and as shown by reference number 304, the recycling management platform 302 may receive, from one or more data storage devices, historical parts data, such as data for rotor blades that belong to a group of wind turbines. The historical parts data may be received over a network (e.g., the Internet, etc.) via a communication interface, such as via an application programming interface (API) or a similar type of interface. The historical parts data for a rotor blade may include component data that provides information on respective components of the rotor blade and/or materials data that provides information on respective materials used within the rotor blade.

The component data may include information relating to one or more spar caps, one or more shear webs, a shell of the rotor blade, a component corresponding to the leading edge of the rotor blade, a component corresponding to the trailing edge of the rotor blade, and/or the like. At a value level, the component data may include a component identifier that identifies the component, model data indicating a model number of the component, type data identifying a type of component, a rotor blade identifier (e.g., identifying a rotor blade to which the component is attached), data describing one or more features of the component, and/or the like.

Additionally, or alternatively, the component data may include measurement data that identifies (or can be used to identify) boundaries of the component and/or boundaries of areas or regions within the component. For example, the measurement data may include data identifying a length of a component, a height of the component, a width of the component, an area and/or surface area of the component, and/or the like. In some embodiments, the recycling management platform 302 may process the measurement data to generate a three-dimensional (3-D) parts map that uses coordinates to define boundaries of the components of the rotor blade.

The materials data may provide information relating to respective material used within the rotor blade, such as core elements (e.g., foam, wood, etc.), fiber layer materials (e.g., synthetic fiber, semi-synthetic fiber, regenerated fiber, carbon fiber, basalt fiber, glass fiber, metal fiber, etc.), a resin matrix (e.g., made using an epoxy resin), a composite material (e.g., comprising structural units and fibers set in an epoxy matrix), material used as part of a lightning protection grid, paint, root inserts, sensors and/or the like. The materials data for a material may further include a material identifier, type data identifying a type of material, a component identifier and/or a rotor blade identifier (e.g., identifying a component and/or a rotor blade that the material is used within), data describing one or more features of the material, and/or the like.

Additionally, or alternatively, the materials data may include measurement data that identifies (or can be used to identify) boundaries of respective materials within the rotor blade (and/or within a given component of the rotor blade). For example, the measurement data may include data identifying a length of a material, a height of the material, a width of the material, an area and/or surface area of the material, and/or the like. In some embodiments, the recycling management platform 302 may process the measurement data to add the material to the 3-D parts map (e.g., such as by having coordinates define boundaries of the material as that material is used within the rotor blade).

Additionally, or alternatively, the materials data may include manufacturing data that provides information on conditions under which respective materials were manufactured. For example, the manufacturing data for a material may include data relating to specific acts of manufacturing. To provide a specific example, when the material is cured, the manufacturing data collected may include temperature data indicating a temperature at which the material was cured, time data indicating a duration during which the material was cured, pressure data indicating a pressure that the material was exposed to during a curing process, data indicating a difference between a measured characteristic of the material during the curing process and a baseline characteristic (e.g., which may be the standard/norm for curing that type of material), and/or the like. Similar types of data may be collected for other acts or processes associated with manufacturing. To the extent these acts or processes associated with manufacturing apply to specific components of the rotor blade, similar types of data may be collected for respective components of the rotor blade.

As shown by reference number 306, the recycling management platform 302 may receive historical operational data for the rotor blades. For example, the recycling management platform 302 may receive historical operational data for the rotor blades from one or more data storage devices. The historical operational data may be received over a network (e.g., the Internet, etc.) via a communication interface, such as via an API or a similar type of interface.

The historical operational data for respective rotor blades may include installation data that provides information relating to the installation of respective rotor blades, daily operations data that provides information relating to one or more daily operations performed over the lifespan of respective rotor blades, service data that provides information relating to services that were performed for respective rotor blades (e.g., inspection, maintenance, repair, etc.), weather data that provides information relating to weather forecasts made in geographic locations corresponding to respective rotor blades, and/or weather data measured at the site of operation and/or the like.

The installation data for a rotor blade may include time data indicating a time and/or date during which the rotor blade was installed, events data indicating one or more events that occurred during the installation process, and/or the like. To provide a specific example, if a rotor blade was dropped or damaged during an installation process, events data may be created that includes an event identifier, time data indicating a time and/or date during which the event occurred, data describing the event, and/or the like. The data describing the event may, for example, include data identifying one or more components or materials that were damaged or affected by the event, data identifying an area or region within the rotor blade at which the damage occurred, and/or the like.

The daily operations data for a rotor blade may include energy generation data, operating time data, measured sensor data, and/or the like. The energy generation data may include data identifying a measured quantity of energy generated by the wind turbine (to which the rotor blade is attached) over a given time period and/or data identifying an amount or degree to which the rotor blade contributed to that energy generation. The operating time data may include data identifying a duration during which the wind turbine (and/or the rotor blade) was operational, measured sensor data that includes data identifying one or more sensor measurements collected over a given time period (e.g., a period during which the rotor blade is operational). For example, the measured sensor data may include rotations data identifying a number of rotations of the rotor blade over a given time period, speed data identifying a speed of the rotor blade over a given time period, vibrations data identifying a measurable degree of vibration of the rotor blade over a given time period, thrust force data identifying a thrust force applied to the rotor blade at a given time period, and/or the like.

The service data for a rotor blade may include inspection data that provides information relating to an inspection of the rotor blade, maintenance/repairs data that provides information relating to any maintenance and/or repairs that were performed on the rotor blade, and/or the like. The inspection data may include time data indicating a time and/or date at which an inspection was made, type data indicating a type of inspection made, results data describing a result of the inspection, and/or the like. The maintenance/repairs data may include time data indicating a time and/or date at which maintenance and/or repair was performed on the rotor blade, type data indicating a type of maintenance and/or repair performed, parts data indicating a component, an area or region within the component, material, and/or portion of the material that was subject to the maintenance and/or repair, results data describing a result after the maintenance and/or repair had been performed, and/or the like.

In some embodiments, the inspection data may include non-destructive test (NDT) data. NDTs are used to test various components and/or materials of a wind turbine, such as components and/or materials of the rotor blade. The NDT data may provide information relating to one or more NDTs, such as strain measurement, acoustic emission, ultrasonic vibration, thermal imaging, machine vision, and/or the like. For example, the NDT data may include type data indicating a type of NDT, time data indicating a time and/or date during which the NDT was performed, parts data indicating a component, material, and/or location within the component and/or material that was targeted for the NDT, description data describing the NDT performed, results data indicating one or more results of the test, and/or the like.

The maintenance/repairs data may include time data indicating a date and/or time on which maintenance and/or repair of the rotor blade was made, type data indicating a type of maintenance and/or repair made, parts data indicating a component, material, and/or location within the component and/or material that was targeted for maintenance and/or repair, description data describing the maintenance and/or repair, and/or the like. To provide a few examples, maintenance/repairs data may be collected for a leading edge erosion repair (e.g., coating, tapes, or shields can be used as an additional layer to protect the leading edge), an injection repair and viscous flow (e.g., filling and sealing by injecting resin or appropriate material), a patch/scarf repair (e.g., to remove a damaged region, leaving a straight stepped or tapered hole, and applying a patch to the hole), a curing and adhesive development type repair, replacing a failed part and/or the like. Additional types of repairs may include repairs from damage incurred during shipping, cosmetic damage, coating repairs, and/or complex blade repairs, such as a blade split tip, a structural repair, lightning strike repair, an internal repair, a laminate repair, a tip shell replacement, and/or the like.

The weather data may include data relating to weather forecasts or measured weather data at geographic locations of respective wind turbines. For example, the weather data may include weather data for a geographic location at which a wind turbine is installed. The weather data may include data indicating a temperature, data indicating a wind speed, data indicating wind shear, data indicating wind turbulence, data indicating an amount of rain or snow, data indicating whether lightning was present, and/or the like. The weather data may be collected at periodic intervals. In some embodiments, the weather data may include data that identifies one or more averages relating to the weather forecasts, such as an average wind speed over a time interval, average temperature, etc.

As shown by reference number 308, the recycling management platform 302 may receive end-of-life (EOL) testing data for the rotor blades. For example, the recycling management platform 302 may receive EOL testing data from one or more data storage devices. The EOL testing data may be received over a network (e.g., the Internet, etc.) via a communication interface, such as via an API or a similar type of interface.

The EOL testing data may include information relating to one or more performance tests that are performed when respective rotor blades reach the end of their term of life. For example, the EOL testing data may provide information relating to quality measurements that indicate a quality for respective components and/or materials of the rotor blades. To provide a specific example, the EOL testing data may include reusability scores for respective components and/or materials of a rotor blade. The reusability scores may, for example, be based on residual values of materials, structural integrity values of the materials, and/or measured lengths of fibers of the materials.

In some embodiments (not shown), prior to using the historical data to train the data model, the recycling management platform 302 may perform one or more preprocessing operations to standardize the historical data into a uniform data type, data format, and/or the like. For example, the historical data may be received in different file types and/or formats and the recycling management platform 302 may apply appropriate standardization techniques to different data types or data formats, such that the historical data is converted into a uniform data type, data format, etc.

As shown in FIG. 3B, and by reference number 310, the recycling management platform 302 may select features to use to train the data model. For example, the recycling management platform 302 may identify a feature set that includes features capable of being used to train the data model and may select a subset of the identified features.

A feature may be a measurable property or characteristic that can be used to train the data model using machine learning. The feature set may include features for historical data values, features for aggregated historical data values, features for combinations of historical data values, features for benchmarks for one or more of these values, features for relationships between two or more these values, and/or the like. Specific example features are provided below.

The features for historical parts data may, for example, include a feature identifying a type of component, a feature identifying a type of material, a feature identifying a measurement of a component, a feature identifying a measurement of a material, a feature identifying an area or region at which a component of a rotor blade is located, a feature identifying an area or region at which material within a rotor blade is located, and/or the like.

Similar features may be determined for each of the other types of historical data. For example, the feature set may include features relating to historical operational data, which may include features relating to installation data, daily operations data, service data, and/or weather data. Additionally, the feature set may include features relating to EOL testing data, which may include features relating to quality measurements taken at the end of the term of life of respective wind turbines.

As described above, the feature set may include features for aggregated historical data values, features for combinations of historical data values, features for benchmarks, and/or features for relationships between two or more of these values. For example, the features for the aggregated data values may include features relating to totals, averages, means, modes, and/or the like. The features for different combinations of historical data values may include features for all (or some) combinations of two or more different historical data values. The features for the benchmarks may include benchmarked values for different types of historical data. For example, a benchmarked value for the EOL testing data may be a value indicating a (preferred) quality for a particular material and/or component. To provide another example, a benchmarked value for the daily operations data may include a value indicating a benchmarked level of performance for the rotor blade and/or a component thereof.

The features for the relationships include a value indicating a relationship or association between two or more other values (i.e., two or more historical data values, combinations of values, aggregations of values, etc.), a value indicating a trend found within the data, and/or the like. For example, assume a subset of the rotor blades each have a material that shares the same EOL quality grade. If the historical operational data for each of these rotor blades includes installation data indicating that the same material was damaged during an installation process, then the recycling management platform 302 may identify, as a feature, that a relationship exists between this particular installation data value and the quality grade of the material. Stated differently, this relationship can be described as the particular installation data value being indicative of the quality grade of the material, as impacting the quality grade of the material in some manner, etc. One skilled in the art can appreciate that a multitude of different relationships between historical data values and quality grades can be identified.

In some embodiments, the recycling management platform 302 may identify the feature set by processing the historical data using one or more feature identification techniques. The one or more feature identification techniques may include a text mining and latent semantic analysis (LSA) technique, a trend variable analysis technique, an interest diversity analysis technique, a neural networking technique, a composite indicators analysis technique, a clustering analysis technique, and/or the like.

In some embodiments, the recycling management platform 302 may select a subset of the identified features by processing the feature set and/or the historical data using one or more feature selection techniques. The one or more feature selection techniques may include one or more filtering techniques, one or more wrapper techniques, one or more embedded techniques, and/or the like. The one or more filtering techniques may be used to remove duplicate, redundant features. These techniques may include a chi-square test, a correlation coefficient, a variance threshold, and/or the like. The one or more wrapper techniques may involve an iterative approach to feature selection (and/or reduction), and may include a forward selection technique, a backward elimination technique, a bi-directional elimination technique, an exhaustive selection technique, a recursive elimination technique, and/or the like. The one or more embedded techniques may include a regularization technique, a tree-based selection technique, and/or the like.

Additionally, or alternatively, the recycling management platform 302 may receive features to use to train the data model. For example, a feature set may be determined by a domain expert and the feature set may be provided to (or made accessible to) the recycling management platform 302.

In this way, the recycling management platform 302 determines features to use to train the data model.

As shown in FIG. 3C, and by reference number 312, the recycling management platform 302 may train the data model to determine quality grades of materials of a rotor blade based on an expected reusability of the materials. For example, the recycling management platform 302 may train the data model by using one or more machine learning techniques to analyze the historical data and/or the determined features. The one or more machine learning techniques may include classification-driven training technique, a logistical regression-based training technique, a Naïve Bayesian classifier technique, a support vector machine (SVM) technique, a neural network, and/or the like.

In some embodiments, the recycling management platform 302 may train the data model using an iterative approach. For example, the recycling management platform 302 may use the data model to process historical training data for a particular rotor blade to cause the data model to determine expected reusability scores for materials of the rotor blade. The historical training data may exclude known outputs such that the data model is effectively making a prediction as to the reusability scores for the materials.

Next, the expected reusability scores may be used to determine quality grades for respective materials. In some embodiments, the data model may, as a final processing step, associate respective reusability scores with corresponding quality grades. In some embodiments, this step may be performed external to the data model. For example, the recycling management platform 302 may reference a data structure that associates expected reusability scores with specific quality grades for materials, such that the expected reusability scores output by the data model may be mapped to corresponding quality grades.

Continuing with the example, the quality grades for the materials (e.g., which correspond to the determined expected reusability scores) may be compared against the actual quality grades of respective materials. Assume, for example, that the recycling management platform 302 were to determine an incorrect quality grade. In this case, the recycling management platform 302 may update one or more weight values and/or threshold values of the data model, such that the data model is re-configured to make more accurate quality determinations when making a subsequent determination as to the expected reusability of materials of a rotor blade.

In this way, the recycling management platform 302 trains the data model to determine quality grades of materials based on the expected reusability of the materials.

As indicated above, FIGS. 3A-3C are provided merely as an example. Other examples may differ from what is described with reference to FIGS. 3A-3C. For example, there may be additional devices and/or networks, fewer devices and/or networks, different devices and/or networks, or differently arranged devices and/or networks than those shown in FIGS. 3A-3C. Furthermore, two or more devices shown in FIGS. 3A-3C may be implemented within a single device, or a single device shown in FIGS. 3A-3C may be implemented as multiple and/or distributed devices. Additionally, or alternatively, a set of devices (e.g., one or more devices) of example embodiment(s) 100 may perform one or more functions described as being performed by another set of devices of example method 300.

Figure 4A:
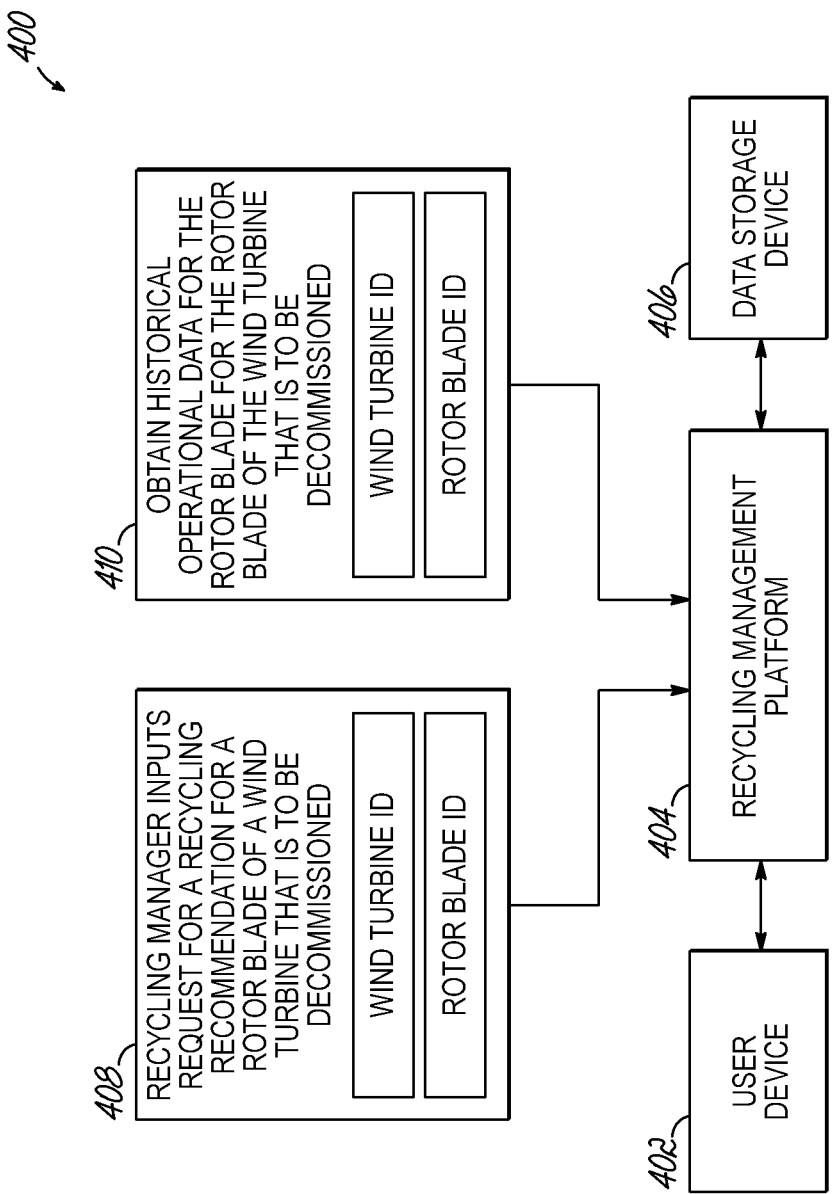
FIG. 4A is a diagram of the recycling management platform obtaining historical operational data for a rotor blade based on a request from a user device.
Figure 4B:
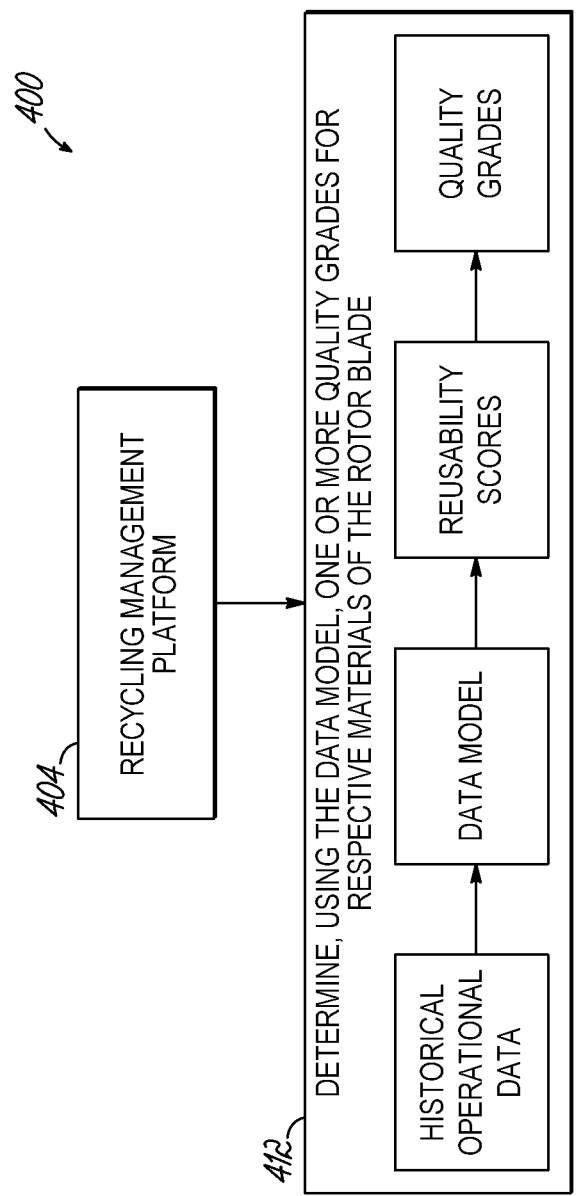
FIG. 4B is a diagram of the recycling management platform using the data model to determine one or more quality grades for respective materials of the rotor blade.
Figure 4C:
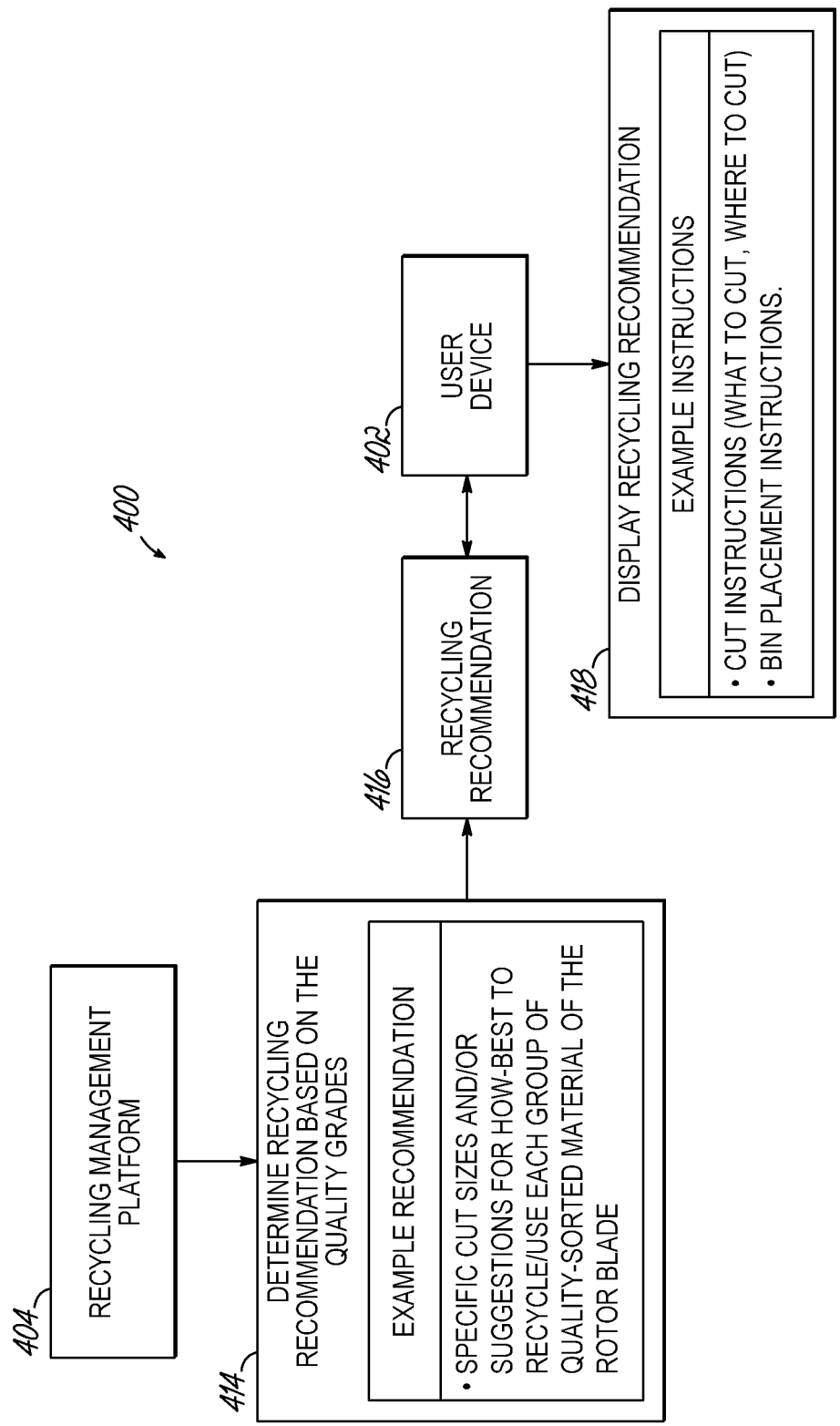
FIG. 4C is a diagram of the recycling management platform determining a recycling recommendation based on the one or more quality grades and providing the recycling recommendation to a user device.

FIGS. 4A-4C are diagrams of an example method 400 for using machine learning to determine quality grades of materials of a rotor blade of a wind turbine and for making a recycling recommendation based on the quality grades. While one or more embodiments described herein refer to determining the quality grades of materials of a rotor blade, it is to be understood that this is provided by way of example. In practice, example method 400 may be used to determine quality grades for materials of other components of a wind turbine. Additionally, or alternatively, example method 400 may be used to determine quality grades of materials of other devices/machines, such as materials of a printed circuit board (PCB), materials of a vehicle (e.g., a boat, a train, a car, etc.), composite materials, and/or the like.

As shown in FIG. 4A, example method 400 involves data communications between a user device 402, a recycling management platform 404, and a data storage device 406. As shown by reference number 408, a user, such as a recycling manager, may input a request for a recycling recommendation for a rotor blade of a wind turbine that is to be decommissioned. For example, the recycling manager may interact with a user interface of the user device 402 to input the request for the recycling recommendation. In some embodiments, the user interface may be part of an application and/or API that permits users to submit recycling requests to the recycling management platform 404. When the recycling manager submits the request, request data may be provided to the recycling management platform 404. The request data may include a wind turbine identifier for the wind turbine and/or a rotor blade identifier for the rotor blade.

As shown by reference number 410, the recycling management platform 404 may obtain historical operational data for the rotor blade of the wind turbine that is to be decommissioned. For example, the recycling management platform 404 may, based on receiving the request data, provide a request for the historical operational of the rotor blade to the data storage device 406. Data storage device 406 may use a data structure to store the historical operational data in association with the wind turbine identifier and/or the rotor blade identifier. As such, the data storage device 406 may use the received identifier(s) to identify and provide the recycling management platform 404 with the historical operational data.

The historical operation data for the rotor blade may include installation data, daily operations data, service data, weather data, and/or the like. While each respective type of operational data is described in detail in connection with FIG. 3A, it is noted that each type of data is not necessarily required for making a recycling recommendation. For example, certain types of daily operations data may have been collected specifically for training purposes. These types of daily operations data may require that sensors be affixed or in range of rotor blades and may be configured specifically to collect additional daily operations data used to train the data model. However, the recycling management platform 404 is still able to make a recycling recommendation without that additional daily operations data.

In some embodiments, the recycling management platform 404 may obtain other types of historical data from the data storage device 406. For example, the recycling management platform 404 may obtain historical parts data and/or end-of-life (EOL) testing data for the rotor blade. With respect to the historical parts data, the recycling management platform 404 may provide the wind turbine identifier to the data storage device 406. Data storage device 406 may store the wind turbine identifier in association with a model identifier that identifies a model of the rotor blade. The data storage device 406 may use the model identifier to obtain historical parts data for that particular model of rotor blade and may provide the historical parts data to the recycling management platform 404.

As shown in FIG. 4B, and by reference number 412, the recycling management platform 404 may determine, using the data model, one or more quality grades for respective materials of the rotor blade. For example, the recycling management platform 404 may provide the historical operational data (and/or any other historical data that has been obtained) as input to the data model. Training of the data model is described in connection with FIGS. 3A-3C. The data model may process the historical operational data using machine learning and may output one or more expected reusability scores. An expected reusability score for a material may be determined based on at least one of an expected residual strength of the material, an expected structural integrity of the material, or expected end-of-life (EOL) fiber lengths of fibers associated with the material.

In some embodiments, the recycling management platform 404 may use the data model to determine an expected reusability score for a material of the rotor blade. For example, by processing the historical operational data using the data model, the recycling management platform 404 may determine that the historical operational data includes data relating to the material that is indicative of a particular residual strength, data relating to the material that is indicative of a particular structural integrity, and/or data relating to the material that is indicative of a particular EOL fiber length. Specifically, the historical operational data may include installation data indicating that a portion of the rotor blade that uses the material was damaged during an installation process, daily operations data indicating that the rotor blade was used in a wind turbine that had a high usage rate (e.g., causing additional wear and tear on the material), and service data indicating that certain repairs that were made to the material. Each of the respective historical operational data values may be indicative of the material having a low residual value and/or low structural integrity, (e.g., relative to an average residual value, an average structure integrity, etc.). Similarly, each of the respective historical operation data values may be indicative of fibers of the material as having a low fiber length (e.g., relative to an average fiber length). This may cause the data model to output a low expected reusability score for the material.

In some embodiments, the recycling management platform 404 may use the data model to determine expected reusability scores for multiple materials included in a composite material. For example, a composite material for the rotor blade may include multiple materials, such as fiber, metal, resin, and/or the like. By processing the historical operational data, the recycling management platform 404 may determine an expected reusability score for the fiber, an expected reusability score for the metal, and an expected reusability score for the resin. Each respective expected reusability score may be determined based on historical data values indicative of a particular residual strength, a particular structural integrity, and/or a particular EOL fiber length. These expected reusability scores may, for example, be different, if each material responds differently to the effects of aging, responds differently to impact from an external object, responds differently to exposure to weather, and/or the like.

In some embodiments, the recycling management platform 404 may use the data model to determine multiple expected reusability scores for the same material. For example, assume the historical data used to train the data model includes historical parts data for the rotor blade. The historical parts data includes measurement data that identifies boundaries of the material (e.g., within the rotor blade, within a component of the rotor blade, etc.). As such, the recycling management platform 404 can use the data model to determine that certain historical operational data values, which correspond to specific portions (e.g., areas, regions, etc.) of the same material, are indicative of a particular residual strength, a particular structural integrity, and/or a particular EOL fiber length.

In some embodiments, the recycling management platform 404 may determine quality grades for materials, or for portions of materials, based on the determined expected reusability scores. For example, the recycling management platform 404 may have access to a data structure that associates ranges of expected reusability scores with certain quality grades. As such, the recycling management platform 404 may reference the data structure to identify, for each expected reusability score, a corresponding quality grade.

To provide an illustrative example, four quality grades may be used: quality grade A, quality grade B, quality grade C, and quality grade D. The data structure may associate a quality grade value for each respective quality grade with ranges of expected reusability scores. It is to be understood that this is provided by way of example, and that in practice, a different system of classifying quality grades may be implemented.

In this way, the recycling management platform 404 determines one or more quality grades for respective materials of the rotor blade.

As shown in FIG. 4C, and by reference number 414, the recycling management platform 404 may determine a recycling recommendation based on the quality grades. The recycling recommendation may include one or more sets of instructions for recycling materials of the rotor blade, such as a set of cut instructions indicating how to cut the rotor blade, a set of bin placement instructions indicating to sort materials or subsets of materials into particular recycling containers, and/or the like.

In some embodiments, the recycling management platform 404 may determine the recycling recommendation by referencing a data structure. For example, the recycling management platform 404 may have access to a data structure that associates data identifying quality grades of materials with different sets of instructions that may be used as part of a recycling recommendation. The recycling management platform 404 may reference the data structure to determine which sets of instructions are stored in association with each of the determined quality grades. The sets of instructions may be combined and used as the overall recycling recommendation.

In some embodiments, the recycling management platform 404 may determine a set of cut instructions indicating to cut the rotor blade in a way that separates materials or subsets of respective materials that have different quality grades. For example, if different areas of a spar cap have different quality grades, the set of cut instructions may indicate to cut the spar cap in a way that creates spar cap pieces which are effectively separated based on quality grade. In some embodiments, the set of cut instructions may indicate where to cut each respective material.

In some embodiments, the recycling management platform 404 may determine a set of bin placement instructions indicating to sort materials or subsets of materials into different recycling containers. This allows materials and/or subsets of materials to be sorted into different recycling containers, such that each recycling container is dedicated to a specific quality grade.

As shown by reference number 416, the recycling management platform 404 may deliver the recycling recommendation to the user device 402. In some embodiments, the recycling recommendation may be delivered to another recipient, such as an electronic mail (email) account or related account. As shown by reference number 418, the user device 402 may display the recycling recommendation. This may allow the recycling manager to use the recycling recommendation to optimize the process of recycling one or more materials of the rotor blade.

In some embodiments, the recycling recommendation may be provided to a controller (e.g., a computing device with a processor) that is part of an automated or semi-automated recycling facility. The automated or semi-automated recycling facility may have one or more pieces of equipment configured to automatically perform certain recycling tasks. The controller may be configured to send instructions to respective pieces of equipment to permit the equipment to perform the recycling tasks autonomously. In this case, the controller may use the recycling recommendation to generate instructions that permit or cause respective pieces of equipment to perform recycling tasks such as cutting a material in a certain way, placing a material into a certain recycling container, and/or the like.

In some embodiments, the recycling recommendation may be provided to a user device of an operator of recycling equipment. For example, the recycling recommendation may be provided to and displayed on a user interface of the user device. The user interface may display instructions that the operator can use to perform a recycling task, such as the cut instructions and/or recycling container instructions described herein.

As indicated above, FIGS. 4A-4C are provided merely as an example. Other examples may differ from what is described with reference to FIGS. 4A-4C. For example, there may be additional devices and/or networks, fewer devices and/or networks, different devices and/or networks, or differently arranged devices and/or networks than those shown in FIGS. 4A-4C. Furthermore, two or more devices shown in FIGS. 4A-4C may be implemented within a single device, or a single device shown in FIGS. 4A-4C may be implemented as multiple and/or distributed devices. Additionally, or alternatively, a set of devices (e.g., one or more devices) of example method 400 may perform one or more functions described as being performed by another set of devices of example embodiment(s) 400.

Figure 5:
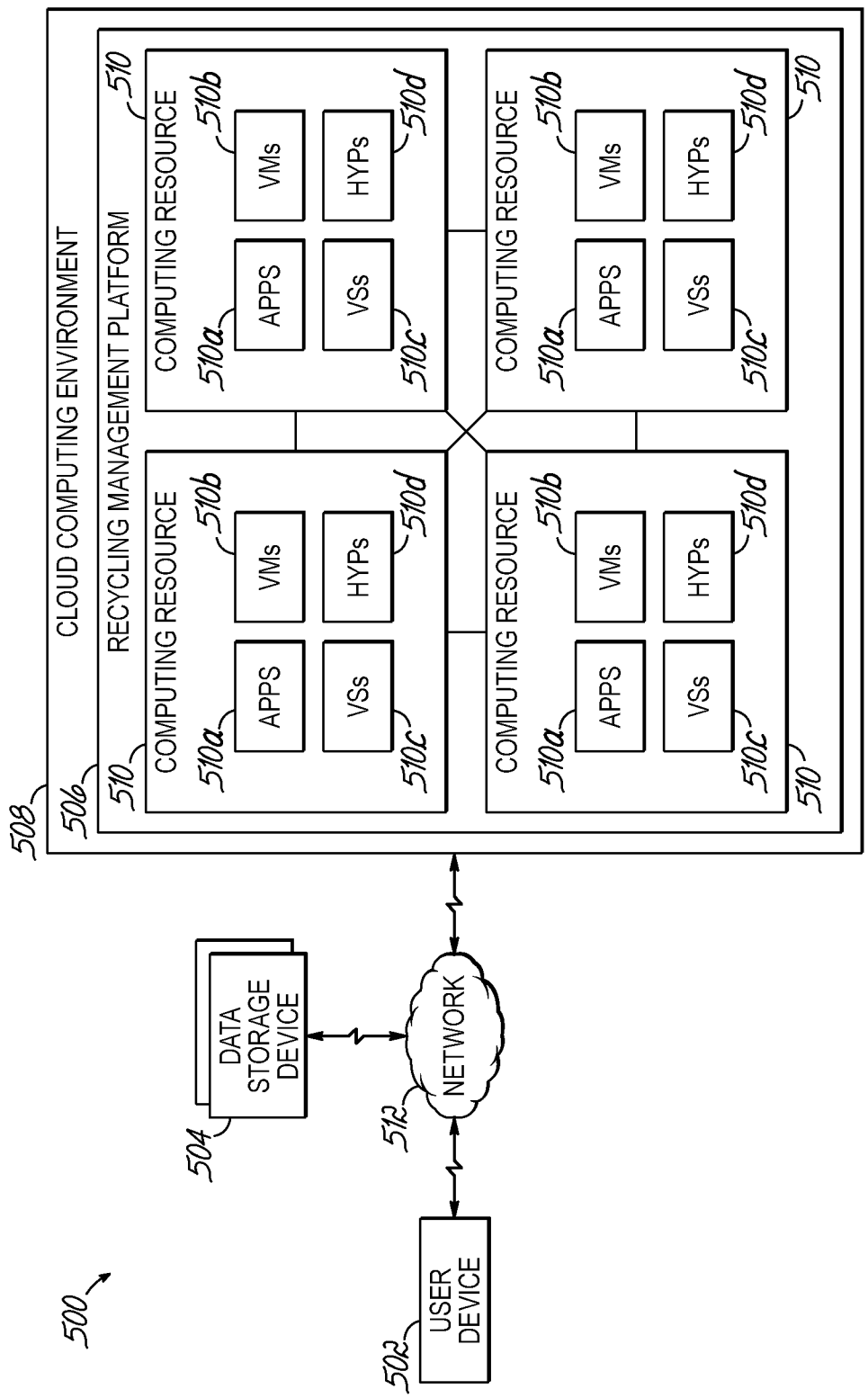
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a user device 502, a data storage device 504, a recycling management platform 506 supported within a cloud computing environment 508, and/or a network 512. Devices of environment 500 may interconnect via wired connections, wireless connections, or a combination of wired and wireless connections. User device 502 may correspond to user device 402. Data storage device 504 may correspond to data storage device 406. Recycling management platform 506 may correspond to recycling management platform 302 and/or recycling management platform 404.

User device 502 includes one or more devices capable of receiving, generating, storing, processing, and/or providing information associated with a recycling recommendation. User device 502 may include a device, such as a tablet computer (e.g., an Pad, etc.), a mobile phone (e.g., a smart phone, a radiotelephone, etc.), a laptop computer, a handheld computer, a server computer, a gaming device, a wearable communication device (e.g., a smart wristwatch, a pair of smart eyeglasses, etc.), or a similar type of device.

In some embodiments, the user device 502 may provide a request for a recycling recommendation to the recycling management platform 506. In some embodiments, the user device 502 may receive a recycling recommendation from the recycling management platform 506.

Data storage device 504 includes one or more devices capable of receiving, storing, processing, and/or providing historical data. Data storage device 504 may include a server device or a group of server devices. In some embodiments, data storage device 504 may support a data structure that associates different types of historical data. In some embodiments, data storage device 504 may receive a request (e.g., a query) for historical data from the recycling management platform 506. This may cause the data storage device 504 to provide the recycling management platform 506 with the historical data.

Recycling management platform 506 includes one or more devices capable of receiving, storing, processing, and/or providing information associated with wind turbines and/or recycling. Recycling management platform 506 may include a server device (e.g., a host server, a web server, an application server, etc.), a data center device, or a similar device.

In some embodiments, the recycling management platform 506 may receive a request for a recycling recommendation from the user device 502. In some embodiments, the recycling management platform 506 obtains from data storage device 504, historical data associated with one or more rotor blades of a wind turbine. For example, the recycling management platform 506 may provide the data storage device 504 with a request for historical data. This may cause the data storage device 504 to provide the historical data to the recycling management platform 506.

In some embodiments, the recycling management platform 506 stores or has access to a data model that has been trained using machine learning. In some embodiments, the recycling management platform 504 may train the data model using the historical data of a group of wind turbines. In some embodiments, the recycling management platform 504 may receive a trained data model from another device. In some embodiments, the recycling management platform 504 may provide a recycling recommendation to the user device 502.

In some embodiments, as shown, the recycling management platform 506 may be hosted in the cloud computing environment 508. Notably, while embodiments described herein describe the recycling management platform 506 as being hosted in the cloud computing environment 508, in some embodiments, the recycling management platform 506 may not be cloud-based (i.e., may be implemented outside of a cloud computing environment) or may be partially cloud-based.

Cloud computing environment 508 includes an environment that hosts recycling management platform 506. Cloud computing environment 508 may provide computation, software, data access, storage, etc. services that do not require end-user knowledge of a physical location and configuration of system(s) and/or device(s) that hosts the recycling management platform 506. As shown, the cloud computing environment 508 may include a group of computing resources 510 (referred to collectively as "computing resources 510" and individually as "computing resource 510").

Computing resource 510 includes one or more personal computers, workstation computers, server devices, or another type of computation and/or communication device. In some embodiments, the computing resource 510 may host the recycling management platform 506. The cloud resources may include compute instances executing in the computing resource 510, storage devices provided in the computing resource 510, data transfer devices provided by the computing resource 510, and/or the like. In some embodiments, the computing resource 510 may communicate with other computing resources 510 via wired connections, wireless connections, or a combination of wired and wireless connections.

As further shown in FIG. 5, computing resource 510 may include a group of cloud resources, such as one or more applications (APPs) 510a, one or more virtual machines (VMs) 510b, virtualized storage (VSs) 510c, one or more hypervisors (HYPs) 510d, and/or the like.

Application 510a may include one or more software applications that may be provided to or accessed by the user device 502 and/or the recycling management platform 506. Application 510a may eliminate a need to install and execute the software applications on these devices. In some embodiments, one application 510a may send/receive information to/from one or more other applications 510a, via virtual machine 510b. In some embodiments, application 510a may be a recycling management application. The recycling management application may include one or more user interfaces that, when displayed on the user device 502, permit a user to submit a request for a recycling recommendation.

Virtual machine 510b may include a software implementation of a machine (e.g., a computer) that executes programs like a physical machine. Virtual machine 510b may be either a system virtual machine or a process virtual machine, depending upon use and degree of correspondence to any real machine by virtual machine 510b. A system virtual machine may provide a complete system platform that supports execution of a complete operating system ("OS"). A process virtual machine may execute a single program and may support a single process. In some embodiments, virtual machine 510b may execute on behalf of another device (e.g., user device 502), and may manage infrastructure of the cloud computing environment 508, such as data management, synchronization, or long-duration data transfers.

Virtualized storage 510c may include one or more storage systems and/or one or more devices that use virtualization techniques within the storage systems or devices of the computing resource 510. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 510d may provide hardware virtualization techniques that allow multiple operating systems (e.g., "guest operating systems") to execute concurrently on a host computer, such as computing resource 510. Hypervisor 510d may present a virtual operating platform to the guest operating systems and may manage the execution of the guest operating systems.

Network 512 may include one or more wired and/or wireless networks. For example, network 512 may include a cellular network (e.g., a fifth generation (5G) network, a fourth generation (4G) network, such as a long-term evolution (LTE) network, a third generation (3G) network, and/or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
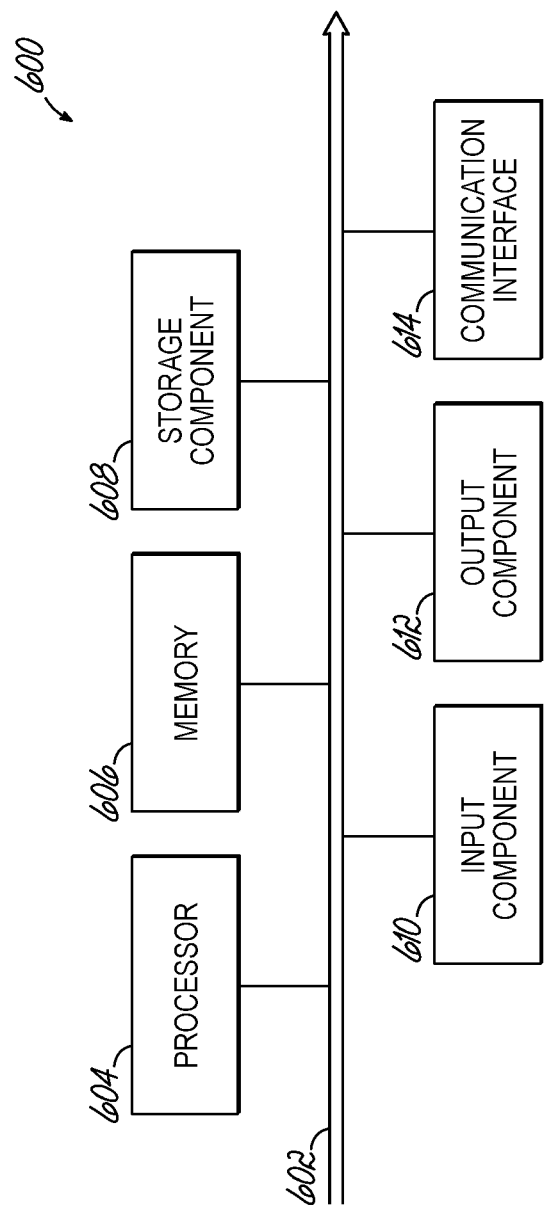
FIG. 6 is a diagram of example components of one or more devices of FIG. 5.

FIG. 6 is a diagram of example components of a device 600. Device 600 may correspond to the user device 502, the data storage device 504, and/or the recycling management platform 506. In some embodiments, the user device 502, the data storage device 504, and/or the recycling management platform 506 may include one or more devices 600 and/or one or more components of device 600. As shown in FIG. 6, device 600 may include a bus 602, a processor 604, a memory 606, a storage component 608, an input component 610, an output component 612, and/or a communication interface 614.

Bus 602 includes a component that permits communication among multiple components of device 600. Processor 604 is implemented in hardware, firmware, and/or a combination of hardware and software. Processor 604 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some embodiments, processor 604 includes one or more processors capable of being programmed to perform a function. Memory 606 includes a random-access memory (RAM), a read only memory (ROM), and/or another type of dynamic or static storage device (e.g., a flash memory, a magnetic memory, and/or an optical memory) that stores information and/or instructions for use by processor 604.

Storage component 608 stores information and/or software related to the operation and use of device 600. For example, storage component 608 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 610 includes a component that permits device 600 to receive information, such as via user input (e.g., a touch screen display, a keyboard, a keypad, a mouse, a button, a switch, and/or a microphone). Additionally, or alternatively, input component 610 may include a sensor for sensing information (e.g., a global positioning system (GPS) component, an accelerometer, a gyroscope, and/or an actuator). Output component 612 includes a component that provides output information from device 600 (e.g., a display, a speaker, and/or one or more light-emitting diodes (LEDs)).

Communication interface 614 includes a transceiver-like component (e.g., a transceiver and/or a separate receiver and transmitter) that enables device 600 to communicate with other devices, such as via a wired connection, a wireless connection, or a combination of wired and wireless connections. Communication interface 614 may permit device 600 to receive information from another device and/or provide information to another device. For example, communication interface 614 may include an Ethernet interface, an optical interface, a coaxial interface, an infrared interface, a radio frequency (RF) interface, a universal serial bus (USB) interface, a Wi-Fi interface, a cellular network interface, or the like.

Device 600 may perform one or more processes described herein. Device 600 may perform these processes based on processor 604 executing software instructions stored by a non-transitory computer-readable medium, such as memory 606 and/or storage component 608. A computer-readable medium is defined herein as a non-transitory memory device. A memory device includes memory space within a single physical storage device or memory space spread across multiple physical storage devices.

Software instructions may be read into memory 606 and/or storage component 608 from another computer-readable medium or from another device via communication interface 614. When executed, software instructions stored in memory 606 and/or storage component 608 may cause processor 604 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

The foregoing disclosure provides illustration and description but is not intended to be exhaustive or to limit the embodiments to the precise form disclosed. Modifications and variations may be made in light of the above disclosure or may be acquired from practice of the embodiments.

Some embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, etc. A user interface may provide information for display. In some embodiments, a user may interact with the information, such as by providing input via an input component of a device that provides the user interface for display. In some embodiments, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, and/or a combination of hardware and software. The actual specialized control hardware or software code used to implement these systems and/or methods is not limiting of the embodiments. Thus, the operation and behavior of the systems and/or methods were described herein without reference to specific software code—it being understood that software and hardware can be used to implement the systems and/or methods based on the description herein.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

The invention claimed is:

1. A method of making a recycling recommendation for a rotor blade of a wind turbine, comprising:
receiving, by a computing device, historical operational data for the rotor blade;
receiving, by the computing device, historical materials data identifying composite materials of the rotor blade;
determining, by the computing device, quality grades for materials included in respective composite materials of the rotor blade, wherein the quality grades are determined by using a data model to process the historical operational data and the historical materials data, and wherein the data model has been trained using machine learning based on one or more of historical operational data for other rotor blades, historical materials data for composite materials of the other rotor blades, and historical end-of-life (EOL) testing data for the other rotor blades, wherein the quality grades for a composite material, of the respective composite materials, include a first set of one or more quality grades for a first material of the composite material and a second set of one or more quality grades for a second material of the same composite material, the first set of one or more quality grades being different than the second set of one or more quality grades;

determining, by the computing device, the recycling recommendation based on the quality grades, wherein the recycling recommendation includes a set of cut instructions indicating to separate the first material from the second material using measurement data that identifies boundaries of the first material and boundaries of the second material;

delivering, from the computing device, the recycling recommendation to a controller that provides the set of cut instructions that include the measurement data to equipment configured to perform a cutting task; and in response to receiving the set of cut instructions, cutting, by the equipment, the composite material of the rotor blade such that the first material with the first set of one or more quality grades is separated from the second material with the second set of one or more quality grades.

2. The method of claim 1, wherein determining the first set of one or more quality grades for the first material and the second set of one or more quality grades for the second material, comprises:

providing the historical operational data and the historical materials data as input to the data model to cause the data model to output a first expected reusability score for the first material and a second expected reusability score for the second material, determining a first quality grade for the first material based on the first expected reusability score, and determining a second quality grade for the second material based on the second expected reusability score.

3. The method of claim 2, wherein the first expected reusability score and the second expected reusability score are based on at least one of:

an expected residual strength of the material,
an expected structural integrity of the material, or
expected end-of-life (EOL) fiber lengths of fibers associated with the particular material.

4. The method of claim 1, wherein the EOL testing data includes reusability scores for materials of the other rotor blades, and wherein respective reusability scores represent a degree to which a material or a portion of that material is reusable.

5. The method of claim 1, wherein the historical materials data includes measurement data identifying boundaries of components of the other rotor blades and data identifying boundaries of the materials included in the respective composite materials, and wherein the data model is trained to associate each respective boundary and/or subset of a boundary with a reusability score.

6. The method of claim 1, wherein the historical operational data for the rotor blade includes at least one of installation data, service data, or weather data, and wherein the historical operational data for the other rotor blades that is used to train the data model includes daily operations data and at least one of installation data, service data, or weather data.

7. The method of claim 1, wherein determining the recycling recommendation comprises:

determining a set of bin placement instructions indicating to sort the first material and the second material into different recycling containers where each respective recycling container corresponds to a specific quality grade.

8. The method of claim 1, wherein determining the first set of one or more quality grades comprises:

determining a first quality grade for a first portion of the first material, and determining a second quality grade for a second portion of the same material, wherein the first quality grade of the first portion is different than the second quality grade of the second portion.

9. The method of claim 8, wherein determining the recycling recommendation comprises:

determining a set of bin placement instructions indicating to place the first portion and the second portion of the same material into different recycling containers.

10. The method of claim 8, wherein determining the recycling recommendation comprises:

determining another set of cut instructions indicating to separate the first portion of the first material from the second portion of the first material;

wherein delivering the recycling recommendation comprises:

delivering said recommendation to the controller or to another controller such that the controller or the other controller provides the set of cut instructions to equipment configured to perform the cutting task; and in response to receiving the set of cut instructions, cutting, by the equipment configured to perform the cutting task, the first material such that the first portion with the first quality grade is separated from the second portion with the second quality grade.

11. A non-transitory computer-readable medium storing instructions, the instructions comprising:

one or more instructions that, when executed by one or more processors, cause the one or more processors to:

receive historical operational data for a rotor blade of a wind turbine;

receive historical materials data identifying composite materials of the rotor blade;

train a data model in said memory using machine learning based on at least one of historical operational data for other rotor blades, historical materials data for composite materials of the other rotor blades, and end-of-life (EOL) testing data for the other rotor blades, determine quality grades for materials included in respective composite materials of the rotor blade, wherein the quality grades are determined by using said data model to process the historical operational data and the historical materials data, wherein the quality grades include at least one of:

a first quality grade for a first material of a composite material, of the respective composite materials, and a second quality grade for a second material of the same composite material, the first quality grade being different than the second quality grade, and a third quality grade for a first portion of the first material and a fourth quality grade for a second portion of the first material;

determine a recycling recommendation based on the quality grades, wherein the recycling recommendation includes at least one of:

a first set of cut instructions indicating to separate first material from the second material using first measurement data that identifies boundaries of the first material and boundaries of the second material, and a second cut instructions indicating to separate the first portion of the first material from the second portion of the first material using second measurement data that identifies boundaries of the first portion and boundaries of the second portion; and deliver the recycling recommendation to a controller that provides the first set of cut instructions that include the first measurement data and/or the second set of cut instructions that include the second measurement data to equipment configured to perform a cutting task, wherein the equipment, in response to receiving the first set of cut instructions, cuts the composite material of the rotor blade such that the first material with the first quality grade is separated from the second material with the second quality grade, and wherein the equipment, in response to receiving the second set of cut instructions, cuts the first material, which is part of the composite material of the rotor blade, such that the first portion with the third quality grade is separated from the second portion with the fourth quality grade.

12. A device, comprising:

one or more memories; and one or more processors, communicatively coupled to the one or more memories, to:

receive historical operational data for a rotor blade of a wind turbine;

receive historical materials data identifying composite materials of the rotor blade;

determine one or more quality grades for materials included in respective composite materials of the rotor blade, wherein the quality grades are determined by using a data model to process the historical operational data and the historical operational data, and wherein the data model has been trained using machine learning based on at least one of historical operational data for other rotor blades, historical materials data for composite materials of the other rotor blades, and end-of-life (EOL) testing data for the other rotor blades, wherein the quality grades for a composite material, of the respective composite materials, include sets of one or more quality grades for each material of the composite material, wherein a set of quality grades for a first material include a first quality grade for a first portion of the first material and a second quality grade for a second portion of the first material;

determine a recycling recommendation based on the one or more quality grades, wherein the recycling recommendation includes a set of cut instructions indicating to separate the first portion of the first material from the second portion of the first material using measurement data that identifies boundaries of the first portion and boundaries of the second portion; and deliver the recycling recommendation to a controller that provides the set of cut instructions that include the measurement data to equipment configured to perform a cutting task, wherein the equipment, in response to receiving the set of cut instructions, cuts the first material, which is part of the composite material of the rotor blade, such that the first portion with the first quality grade is separated from the second portion with the second quality grade.

13. The device of claim 12, wherein the recycling recommendation further includes a set of bin placement instructions indicating to place the first portion of the first material, the second portion of the first material, and the second material into different recycling containers;

wherein delivering the recycling recommendation comprises:

delivering the set of bin placement instructions to the controller or to another controller such that the controller or other controller provides the set of bin placement instructions to equipment configured to perform a bin placement task; and in response to receiving the set of bin placement instructions, placing, by the equipment configured to perform the bin placement task, the first portion of the first material, the second portion of the first material, and the second material into different recycling containers.

* * * * *

UNITED STATES PATENT AND TRADEMARK OFFICE
CERTIFICATE OF CORRECTION

PATENT NO. : 12,437,272 B2  
APPLICATION NO. : 18/425000  
DATED : October 7, 2025  
INVENTOR(S) : Mie Rehmeier et al.

Page 1 of 1

It is certified that error appears in the above-identified patent and that said Letters Patent is hereby corrected as shown below:

In the Specification

Column 5, Line 58, change "commendations" to -- recommendations --.

Column 9, Line 52, change "more these" to -- more of these --.

Column 13, Line 40, change "repairs that were" to -- repairs were --.

Column 16, Line 3, change "an Pad" to -- an iPad --.

In the Claims

Column 23, Claim 11, Line 12, change "second cut" to -- second set of cut --.

Column 23, Claim 12, Line 46, change "and the historical operational" to -- and the historical materials --.

Signed and Sealed this  
Twenty-fifth Day of November, 2025

John A. Squires  
*Director of the United States Patent and Trademark Office*